2,970,976

AQUEOUS EMULSION CONTAINING ORGANO-SILICON RESIN AND A TITANIUM DERIVATIVE, PROCESS FOR MAKING SAME, AND PROCESS OF USING SAME

René Leclercq, Woluwe Saint Pierre, and Jean Colle, Huizingen, Belgium, assignors to Union Chimique Belge, S.A., Brussels, Belgium, a corporation of Belgium No Drawing. Filed Mar. 18, 1957, Ser. No. 646,555

Claims priority, application Belgium Apr. 26, 1956

3 Claims. (Cl. 260—29.2)

Application Ser. No. 605,478, filed August 22, 1956, now abandoned relates to a process for waterproofing porous materials by means of organosilicon compounds, wherein a derivative of titanium and glycerine is used as catalyst.

The present invention relates to a new waterproofing process in which the catalyst is prepared by reacting a titanium compound with a polyalcohol.

As polyalcohols there may be used more especially, ethylene glycol, diethylene glycol, polyethylene glycols, propylene glycol, 1-3-butanediol, 2,3-butanediol and butane-triols.

The titanium and polyalcohol derivative is prepared by the following method:

1 mole of titanium tetrachloride is mixed with 1.5 to 6 moles of a polyalcohol. The mixture is heated at 115° C. until the product is water-soluble. Since this product has an acid reaction, it is necessary to add thereafter a compound having an alkaline reaction. The compounds having an alkaline reaction which may be used are di- and triethanolamines, diethylenetriamine, monoisobutylamine, cyclohexylamine, morpholine, octylamine, aminobutanol, aminoethylpropane-diol, tri-(hydroxymethyl)-aminomethane, and di- and triisopropanolamines.

The silicones resins used are methyl-, methyl-phenyl, amyl-, and methyl-amyl-silicones having an R:Si ratio between 1.2:1 and 1.9:1. In addition to the silicone resins just above defined, the mixture may also contain silicone oils, that is to say, liquids in which the R:Si ratio is substantially equal to 2:1 (R=lower alkyl radical).

As in application Ser. No. 605,478, it is necessary to add emulsifying agents such as: double titanate of triethanolamine and stearic acid, tall oil condensed with 10 moles of ethylene oxide; polyethylene glycol alkylphenyl ether (alcohol containing from 8 to 15 carbon atoms); triethanolamine oleate; and stearyl or octodecylamine acetate.

It is also possible to add stabilizers for maintaining the emulsion for a long period. These include more especially carboxymethylcellulose.

The emulsions are prepared by the method described in the examples. However, it is to be noted that the order in which the various solutions are introduced is not critical.

The emulsions contain from 0.5% to 6% of silicone resin and from 0.01% to 0.5% of metallic titanium.

The invention is applicable to all porous materials: fabric, paper, leather, wood, brickwork, etc. The examples are limited to the waterproofing of a cotton fabric because they show the stability of the results despite several washings with an alkaline soap.

When textile materials are treated, it is possible to add to the emulsions suitable products for improving the properties of the waterproofed fabrics: liquid paraffin, fatty alcohols or fatty acids to improve the handle, urea-formaldehyde resins or the like to make the fabrics wrinkle-proof resistant and anti-static products to reduce fraying.

In the case of leather or wood, insecticides or fungicides will advantageously be added.

In all the examples, the method adopted is the same. Of course, this method may be modified without departing from the scope of the invention.

The specimen of cotton, rinsed and dried, is soaked in the emulsion for about 20 minutes. It is then dried at room temperature (if desired by centrifuging) and then at 110° C. for 30 minutes and at 160° C. for about 5 minutes. It is finally ironed with a hot iron.

The waterproofing effect is determined by means of the Schmerber permeability meter (Teintex, 10 (1948), p. 136–40). The specimen is subjected to a water pressure increasing by 10 cm. per minute and the pressure under which the water penetrates through the fabric is observed. This pressure, expressed in millimetres of water, gives the degree of the waterproofing effect.

The specimen is washed under the following conditions:

Time: 10 minutes.
Temperature: 90–95° C.
Washing solution: 5 g. of Marseilles soap and 2 g. of sodium carbonate per litre.
Rinsings: One at 60° C. and two at room temperature.

In the examples, the compositions of the solutions and emulsions used are indicated by weight.

Emulsion A: P.
  Amylsilicone resin (R:Si=1.6) _____ 12.5
  Stearylamine acetate _____ 0.5
  Water _____ 94.0
Emulsion B:
  Methyl-phenyl silicone varnish containing 50% of aromatic solvent (R:Si=1; $CH_3:C_6H_5=2$) _____ 25.0
  Tall oil condensed with 10 moles of ethylene oxide _____ 1.0
  Trichloroethylene _____ 7.0
  Carboxymethylcellulose _____ 0.1
  Water _____ 74.0

Solution A

A mixture of 190 g. of titanium tetrachloride and 270 g. of 1,3-butanediol is heated at 116° C. until a water-soluble mass is formed. This product contains 13% of titanium.

177 g. of this product are mixed with 224 g. of triethanolamine. After heating at 170° C., a product is obtained which contains 6% of titanium.

The derivative obtained is diluted with a sufficient quantity of water to obtain a solution containing 4.6 g. of titanium per litre.

Solution B 190 g. of titanium tetrachloride and 228 g. of propylene glycol are heated at 110° C. After reaction for 1 hour at this temperature, a product which is fairly hard in the cold state is obtained. This product, which contains about 14% of titanium, is completely water-soluble.

To 312 g. of this product are added 596 g. of triethanolamine, and the mixture is carefully heated with agitation to 170° C. A pasty product containing 5.3% of titanium is obtained, which is completely water-soluble. The product obtained is diluted with water to form a solution containing 7.7 g. of titanium per litre.

Solution C

This solution is obtained in the same manner as solution B, but 318 g. of diethylene glycol are used instead of 228 g. of propyleneglycol. For the neutralization of 401 g. of the reaction product, 447 g. of triethanolamine are required. Finally, the mass is dissolved in water to form a solution containing 7.7 g. of titanium per litre.

Solution D

This solution is prepared in the same manner as solution B, but 186 g. of ethylene glycol are used instead of propylene glycol. The product obtained, which contains 18% of titanium, is neutralized by means of triethanolamine (447 g. for 266.5 g.).

The product obtained is diluted with water to form a solution containing 7.7 g. of titanium per litre.

EXAMPLE 1

The waterproofing emulsion contains:

| | P. |
|---|---|
| Emulsion A | 17 |
| Solution A | 13 |
| Water | 70 |

The test with the Schmerber permeability meter gave the following results:

| | Mm. of water |
|---|---|
| After the treatment | 205 |
| After the first washing | 210 |
| After the second washing | 200 |
| After the third washing | 200 |
| After the fourth washing | 170 |

The waterproofing effect is found to be remarkably stable after four successive washings.

EXAMPLE 2

The waterproofing emulsion contains:

| | P. |
|---|---|
| Emulsion B | 17 |
| Solution B | 13 |
| Water | 70 |

The test with the Schmerber permeability meter gave the following results:

| | Mm. of water |
|---|---|
| After the treatment | 175 |
| After the first washing | 210 |
| After the second washing | 180 |
| After the third washing | 100 |

EXAMPLE 3

The waterproofing emulsion has the following composition:

| | P. |
|---|---|
| Emulsion A | 17 |
| Solution C | 13 |
| Water | 70 |

The tests with the Schmerber permeability meter gave the following results:

| | Mm. of water |
|---|---|
| After the treatment | 210 |
| After the first washing | 220 |
| After the second washing | 205 |
| After the third washing | 115 |

EXAMPLE 4

The waterproofing emulsion has the following composition:

| | P. |
|---|---|
| Emulsion B | 17 |
| Solution D | 13 |
| Water | 70 |

The tests with the Schmerber permeability meter gave the following results:

| | Mm. of water |
|---|---|
| After the treatment | 195 |
| After the first washing | 205 |
| After the second washing | 170 |
| After the third washing | 120 |

We claim:

1. An aqueous water-proofing composition which comprises an aqueous emulsion containing from 0.5 to 6% by weight of organosilicon resins, the hydrocarbon to silicon ratios of which are from 1.2:1.0 to 1.9:1.0, said resins being selected from the group consisting of methyl-silicone, methyl-phenyl silicone, amyl silicone and methyl-amyl-silicone, and an amount of water-soluble organic titanium derivative corresponding to from 0.01 to 0.5% by weight of titanium, said titanium organic derivative being prepared by reacting one mole of a titanium tetrahalide with from about 1.5 to 6 moles of a polyhydric alcohol selected from the group consisting of ethylene glycol, diethylene glycol, propylene glycol, butanediols and butanetriols and adding to the resulting reaction mass, per 100 grams thereof, from about 0.75 to 1.3 moles of an alkaline reacting organic substance selected from the group consisting of amines and amino-alcohols.

2. A process for the production of an aqueous water-proofing composition which comprises adding to an organic solution of a silicone resin selected from the group consisting of methyl-silicone, methyl-phenyl-silicone, amyl-silicone and methyl-amyl-silicone, the hydrocarbon to silicon ratio of said resin being within the range of from 1.2:1.0 to 1.9:1.0, an aqueous solution of a water soluble organic titanium derivative prepared by reacting at about 115° C. one mole of a titanium tetrahalide with 1.5 to 6 moles of a polyhydric alcohol selected from the group consisting of ethylene glycol, diethylene glycol, propylene glycol, butanediols and butanetriols until a water-soluble product is obtained and by adding to each 100 grams of the reaction medium from about 0.75 to 1.3 moles of an alkaline reacting organic substance selected from the group consisting of amines and amino-alcohols.

3. A method of water-proofing porous materials which comprises applying thereto a composition consisting of an aqueous emulsion containing from 0.5 to 6% by weight of organosilicon resins selected from the group consisting of methyl-silicone, methyl-phenyl-silicone, amyl-silicone and methyl-amyl-silicone, the hydrocarbon to silicon ratios of said resins being within the range of from 1.2:1.0 to 1.9:1.0, and an amount of a water-soluble organic titanium derivative corresponding to from 0.01 to 0.5% by weight of titanium, said titanium organic derivative being prepared by reacting one mole of a titanium tetrahalide with from about 1.5 to 6 moles of a polyhydric alcohol selected from the group consisting of ethylene glycol, diethylene glycol, propylene glycol, butanediols and butanetriols, and adding to the resulting reaction mass, per 100 grams thereof, from about 0.75 to 1.3 moles of an alkaline reacting organic substance selected from the group consisting of amines and aminoalcohols, and drying the materials at a temperature between 20 and 160° C.

References Cited in the file of this patent

UNITED STATES PATENTS

| 2,716,656 | Boyd | Aug. 30, 1955 |
|---|---|---|
| 2,735,791 | Peyrot et al. | Feb. 21, 1956 |
| 2,736,721 | Dexter | Feb. 28, 1956 |
| 2,769,732 | Boyd | Nov. 6, 1956 |
| 2,774,690 | Cockett et al. | Dec. 18, 1956 |